(12) United States Patent
Lemaitre

(10) Patent No.: US 6,496,227 B1
(45) Date of Patent: Dec. 17, 2002

(54) SYSTEM WITH CHROMINANCE DELAY LINES

(75) Inventor: Régis Lemaitre, Fontanil-Cornillon (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/294,653

(22) Filed: May 21, 1999

(30) Foreign Application Priority Data

Apr. 23, 1998 (FR) .............................. 98 05097

(51) Int. Cl.[7] .................................. H04N 9/66
(52) U.S. Cl. ...................... 348/638; 348/639; 348/664; 348/666; 348/713
(58) Field of Search ................ 348/638, 639, 348/640, 645, 662, 663, 713, 727, 914, 641, 664, 665, 666; H04N 9/66

(56) References Cited

U.S. PATENT DOCUMENTS

| | | | | | |
|---|---|---|---|---|---|
| 3,553,353 | A | * | 1/1971 | Melchior | 348/640 |
| 3,663,746 | A | * | 5/1972 | Backers et al. | 348/638 |
| 4,064,531 | A | * | 12/1977 | Koubek | 348/237 |
| 4,081,827 | A | * | 3/1978 | Hipwell | 348/455 |
| 4,271,427 | A | * | 6/1981 | Van Den Driessche | 348/638 |
| 4,409,612 | A | * | 10/1983 | Warmuth | 348/640 |
| 4,605,950 | A | * | 8/1986 | Goldberg et al. | 348/389.1 |
| 5,047,841 | A | * | 9/1991 | Robinson | 348/610 |
| 5,194,938 | A | * | 3/1993 | Imbert et al. | 348/491 |
| 5,374,962 | A | * | 12/1994 | Klink | 348/557 |
| 5,459,524 | A | * | 10/1995 | Cooper | 348/498 |
| 5,808,701 | A | * | 9/1998 | Lee | 348/663 |
| 6,038,276 | A | * | 3/2000 | Dinh | 327/156 |
| 6,323,913 | B1 | * | 11/2001 | Prange | 348/566 |

OTHER PUBLICATIONS

8087 IEEE Transactions on Consumer Electronics, Gurp et al., Switched Capacitor Chrominance Base Band Delay Lines for Colour Decoders, Aug. 1987, No. 3, New York, NY, USA, pp. 451–454.

* cited by examiner

*Primary Examiner*—John Miller
*Assistant Examiner*—Brian Yenke
(74) *Attorney, Agent, or Firm*—Lisa K. Jorgenson; Allen, Dyer, Doppelt, Milbrath & Gilchrist, P.A.

(57) ABSTRACT

A system with chrominance delay lines has a first sampled channel including at least one smoothing filter, and has a second unsampled channel. A continuous bypass filter is placed in the second channel to balance the pulse response from these two channels.

15 Claims, 2 Drawing Sheets

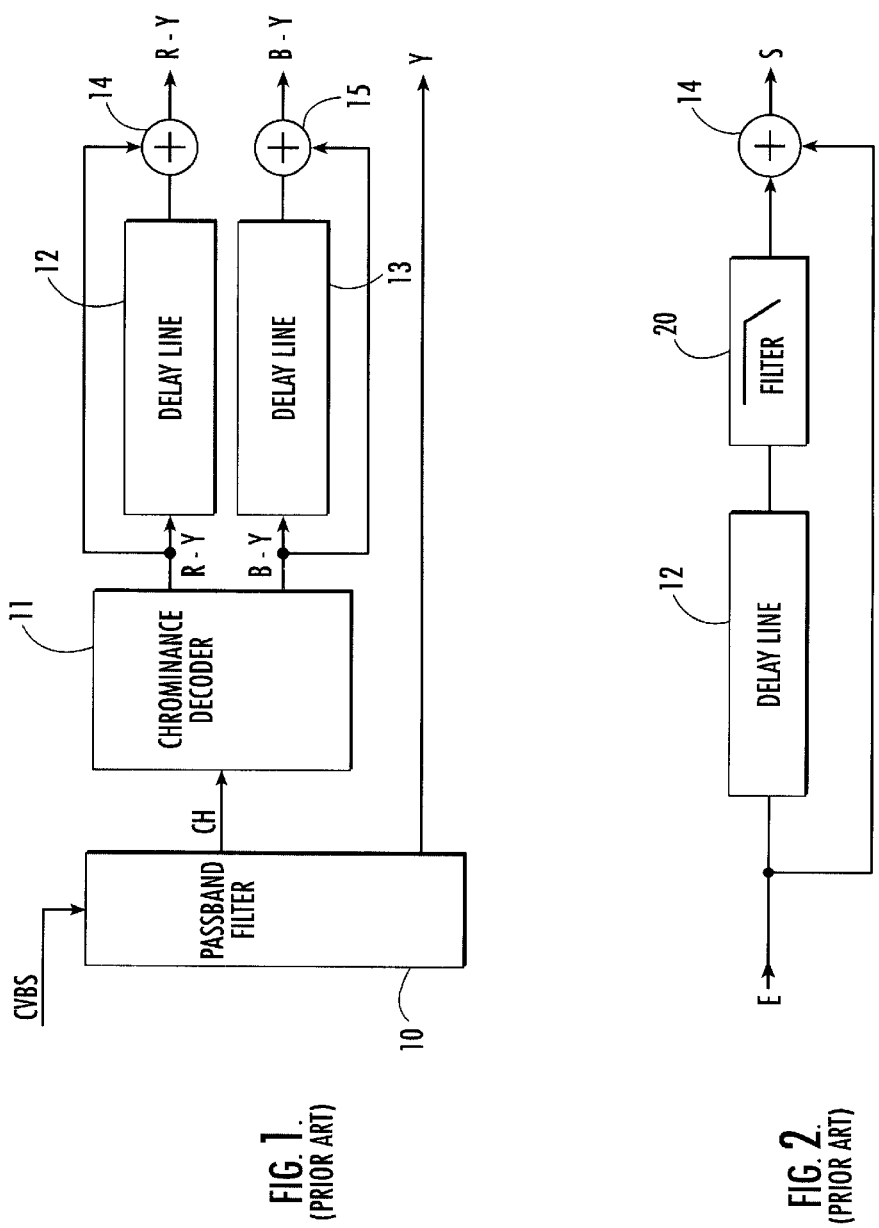

SYSTEM WITH CHROMINANCE DELAY LINES

FIELD OF THE INVENTION

The present invention relates to the field of television, and, more particularly, to demodulation of chrominance signals.

BACKGROUND OF THE INVENTION

Demodulation of chrominance signals in the PAL or SECAM television standard involves the use of delay lines, which typically provides a 64 µs delay. In the PAL standard, the purpose of the delay line is to compensate for phase errors between U and V chrominance signals. In the SECAM standard, the purpose of the delay line is to restore the continuity of signals between successive lines. Traditionally, this type of delay line, which may be a line with piezo-acoustic delay, is inserted as a sub-carrier before demodulation. However, in integrated manufacturing, this delay line usually operates in baseband and is inserted after demodulation.

FIG. 1 schematically illustrates a chrominance demodulator with a delay line operating in baseband, according to the prior art. FIG. 1 corresponds to FIG. 1 disclosed in an article by Van Gurp et al., titled "Switched Capacitor Chrominance Base-Band Delay Lines For Colour Decoders." This article is in the IEEE Transactions On Consumer Electronics, volume CE-33, number 3, Aug. 1987, and describes a circuit with switched capacitor baseband delay lines used for chrominance decoders.

The system illustrated in FIG. 1 includes a passband filter 10 which receives the composite video broadcasting signal (CVBS), and outputs the modulated chrominance signal CH. It is followed by the chrominance decoder 11. The chrominance decoder 11 has two outputs R-Y and B-Y, which are connected to respective delay lines 12 and 13 with a 64 µs delay or line duration. The input and output from each of these delay lines 12, 13 are connected to two inputs of a respective adder 14 and 15. A delay line thus combined with an adder forms a comb filter. The upper limits for this type of filter are integer multiples of the line frequency, and the lower limits are half-multiples of the line frequency.

The delay line circuit illustrated in FIG. 1 operates as a comb filter and line memory for the PAL and SECAM standards, and may be formed in an integrated circuit. As described in the above referenced article by Van Gurp et al., each delay line may be a switched capacitor delay line. Such a line is made by multiple sampling, and is sequenced by a clock servo-controlled to the line frequency. The use of a sampled system then requires continuous filtering before (pre-filtering) and after sampling. Pre-filtering (or anti-backflow filtering) is not shown in FIG. 1. In this circuit, the signal to be delayed is then sampled and then delayed by about one line duration in the delay line. A continuous filter then eliminates clock residues. The addition of a signal delayed by one line duration at the unsampled input signal produces the comb filter function.

The circuit in FIG. 1 has the following advantages. In the PAL standard, it reduces interference between the different color signals. In the SECAM standard, it reduces diaphoty. Diaphoty is the interference between chrominance sub-carrier signals in the absence of color, which causes ripple patterns. In the NTSC standard, the circuit rejects luminance residues. Therefore, this type of circuit is compatible with all standards.

An, article titled "A Full Integrated Automatic Multistandard Chroma Decoder," by Imbert et al., found in the IEEE Transactions On Consumer Electronics, volume 37, number 3, Aug. 1991, describes a multi-standard automatic and integrated chrominance decoder using a BICMOS process combining bi-polar and CMOS circuits. The article also describes a chrominance-baseband delay line including a series of 192 capacitors that are switched one after the other by a sequential pulse generator. These 192 capacitors are switched sequentially by a 192-stage offset register to a write line, and then 64 µs later to a read line. These lines are synchronized by a phase locking loop (PLL) at 6 MHz servo-controlled on the line frequency.

Therefore, as illustrated in FIG. 2, the prior art includes a technique of placing an analog low-pass filter 20 having an order of 2 to 4 on the output side of the delay line 12. The delay introduced by this filter 20 must then be used in the total delay created by the delay line 12. This type of manufacturing is described in the article by Van Gurp et al.

Since the delay due to the delay line 12 itself is related to the clock frequency, specifications for this filter 20 must include frequency and time parameters. These constraints make the design difficult and limitations may be necessary. The most serious of these limitations concerns the differential pulse response. Since the same filtering is not applied to the direct channel (without a delay line), pulse responses of the direct channel and the delayed channel are different. Since the transition times (rise time and fall time) of the direct channel are better than those of the delayed channel, the image suffers from a visible line by line degradation, especially in SECAM. The line degradation is a red-blue indentation called either an FL/2 effect, a line frequency/2 effect, or a mouse tooth effect.

SUMMARY OF THE INVENTION

An object of the invention is to overcome the above described disadvantages by providing a system in which the response of direct and delayed channels is balanced.

This invention relates to a system with chrominance delay lines having a first sampled channel including at least one smoothing filter, and having a second unsampled channel. The system includes a continuous compensation low-pass filter in the second channel to balance the pulse response of these two channels.

In a first approach, a system with chrominance delay lines includes a first delay line and a second delay line for receiving the chrominance demodulator output signals. The outputs from the first and second delay lines are respectively connected to a first input of a first and a second adder through a first smoothing by-pass filter. The inputs of the first and second delay lines are respectively connected to a second input of the first and the second adders through a second continuous compensation low-pass filter. This second filter balances the pulse response.

In a second embodiment, the system includes a third filter placed between the output from the delay line and the first input of the corresponding adder, and a fourth low-pass filter is placed at the adder output for each delay line. The third filter is advantageously a wideband filter capable of compensating the excess delay created by the first filter in the direct channel without modifying the frequency response. The fourth filter provides complementary rejection of the sampling and sub-carrier residues.

The invention also relates to an integrated television processing circuit including the system described above.

BRIEF DESCRIPTION OF THE DRAWINGS

FIG. 1 illustrates a chrominance demodulator with baseband delay lines according to prior art;

FIG. 2 illustrates a variation of the demodulator illustrated in FIG. 1;

DETAILED DESCRIPTION OF THE PREFERRED EMBODIMENTS

The system according to the invention comprises a first sampled channel having at least one continuous low-pass filter 20 smoothing and rejecting clock residues, and a second unsampled channel in which a continuous low-pass filter compensation 21 is inserted to balance the pulse response of these two channels.

Figure 3:
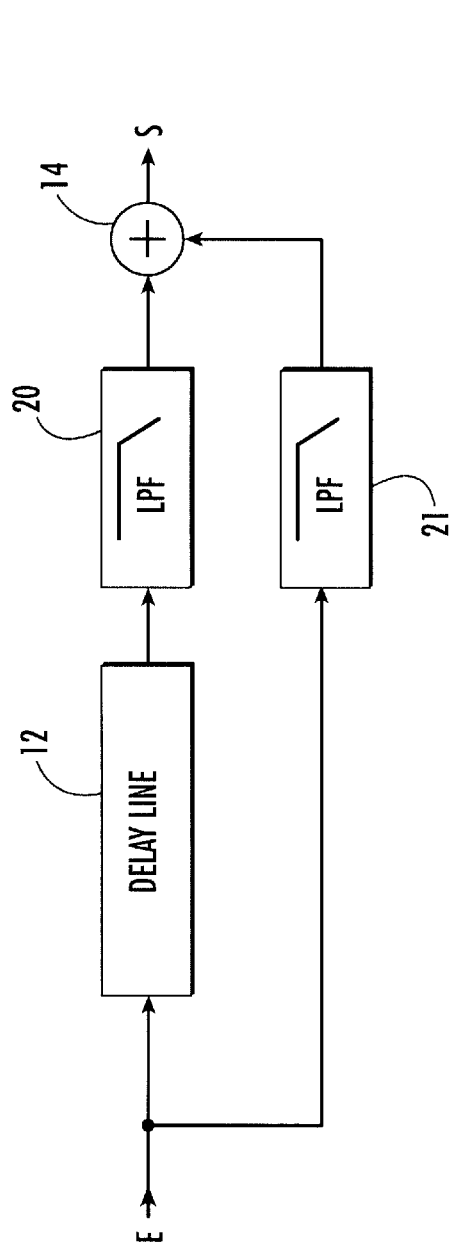
FIG. 3 illustrates a first embodiment of the system in accordance with the present invention.

In a first embodiment of the system, the continuous low-pass compensation filter 21 is inserted in the direct channel, as shown in FIG. 3, to balance the response of the direct and delayed channels. However, the introduction of this low-pass filter 21 causes an additional delay.

In a second embodiment of the system, the system compensates for this delay by adding a delay to the delayed channel. This delay is the difference in the delay between the two channels that must be adjusted to precisely 64 μs. This result can also be obtained by the parameters of the continuous low-pass filter 20 in the delayed channel. However, this may no longer satisfy the initial requirements. The total delay in the direct channel is minimized, since the consequences on the design of television luminance circuits are undesirable.

Figure 4:
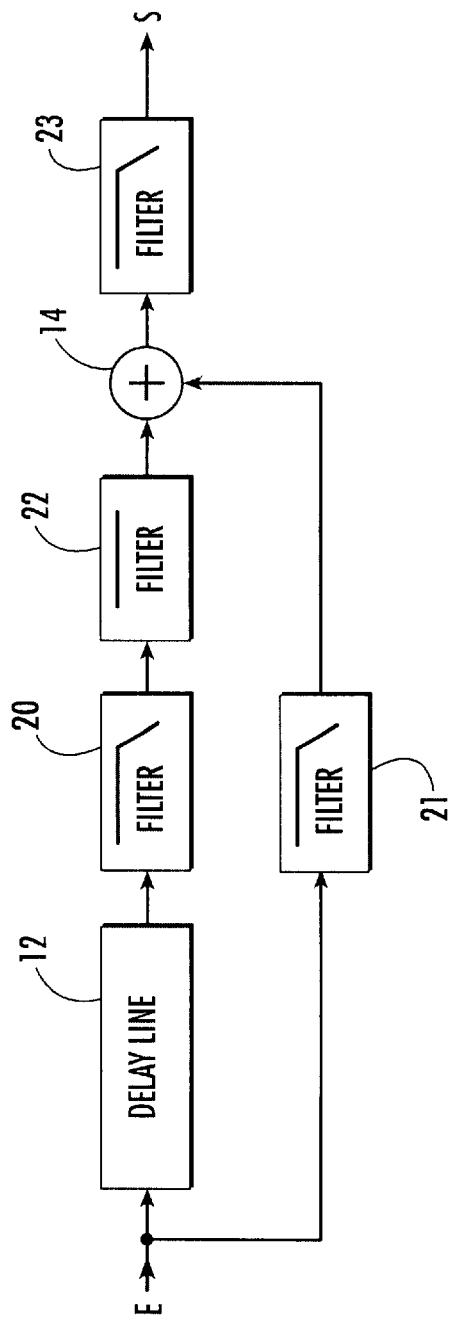
FIG. 4 illustrates a second embodiment of the system in accordance with the present invention.

The second embodiment, as shown in FIG. 4, uses four filters 20, 21, 22 and 23. All parameters can be controlled with this embodiment. These filters are as follows. The low-pass filter 20 is the smoothing filter. The low-pass compensation filter 21 is the pulse response balancing filter. Filter 22 is a wide-pass filter adjusting the total delay to compensate for the excess delay caused by filter 21 in the direct channel without modifying the frequency response. The low-pass filter 23 is a complementary filter to reject clock and sub-carrier residues.

In one example implementation, the first embodiment of the system according to the invention is built into a complex television processing circuit. The sampling frequency is 3 MHz, the low-pass filter 20 is of the Butterworth type of order 4 with a cutoff frequency equal to 1 MHz, and the low-pass compensation filter 21 is a first order filter with a cutoff frequency equal to 2 MHz. The following advantages are then obtained for input signals for which delivery times are set up in 300 ns:

|  |  | Embodiment according to prior art shown in FIG. 2 | Embodiment according to the invention shown in FIG. 3 |
|---|---|---|---|
| Transition time | direct channel | 300 ns | 370 ns |
|  | delayed channel | 500 ns | 430 ns |
|  | difference | 200 ns | 60 ns |
| Attenuation at 1 MHz | direct channel | 0 dB | 1 dB |
|  | delayed channel | 3.7 dB | 1.7 dB |
| Attenuation at 3 MHz (Sampling frequency) | direct channel | 0 dB | 5 dB |
|  | delayed channel | 20 dB | 35 dB |
| Attenuation at 6 MHz (Second harmonic of the sampling frequency) | direct channel | 0 dB | 10 dB |
|  | delayed channel | 40 dB | 60 dB |

Despite the use of only two filters 20 and 21, the performances of the system according to the invention as shown in FIG. 3 is improved as compared with the prior art system illustrated in FIG. 2.

That which is claimed is:

1. A video signal processing circuit comprising:
   a first sampled channel comprising
      at least one smoothing low-pass filter,
      a chrominance demodulator,
      a first delay line having an input receiving a first output signal from said chrominance demodulator, and having an output connected to a first one of said at least one smoothing low-pass filter, and
      a second delay line having an input receiving a second output signal from said chrominance demodulator, and having an output connected to a second one of said at least one smoothing low-pass filter; and
   a second unsampled channel comprising a first continuous compensation low-pass filter for balancing a pulse response of said first sampled channel and said second unsampled channel.

2. A video signal processing circuit according to claim 1, further comprising:
   first and second adders;
   a second continuous compensation low-pass filter connected between the input of said first delay line and a second input of said first adder; and
   a third continuous compensation low-pass filter connected between the input of said second delay line and a second input of said second adder.

3. A video signal processing circuit according to claim 2, further comprising:
   a first wide-pass filter connected between the output from said first delay line and the first input of said first adder; and
   a second wide-pass filter connected between the output from said second delay line and the first input of said second adder.

4. A video signal processing circuit according to claim 2, further comprising:
   a first low-pass filter connected to an output of said first adder; and
   a second low-pass filter connected to an output of said second adder.

5. A video signal processing circuit according to claim 1, wherein said first sampled channel and said second unsampled channel operate in accordance with the PAL television standard.

6. A video signal processing circuit according to claim 1, wherein said first sampled channel and said second unsampled channel operate in accordance with the SECAM television standard.

7. A video signal processing circuit comprising:
- a passband filter having an input for receiving a composite video signal, and an output for providing a chrominance signal;
- a chrominance demodulator connected to the output of said passband filter;
- a first sampled channel comprising
  - a first delay line having an input receiving a first output signal from said chrominance demodulator, and having an output connected to a first smoothing low-pass filter, and
  - a second delay line having an input receiving a second output signal from said chrominance demodulator, and having an output connected to a second smoothing low-pass filter; and
- a second unsampled channel comprising a first continuous compensation low-pass filter for balancing a pulse response of said first sampled channel and said second unsampled channel.

8. A video signal processing circuit according to claim 7, further comprising:
- first and second adders;
- a second continuous compensation low-pass filter connected between the input of said first delay line and a second input of said first adder; and
- a third continuous compensation low-pass filter connected between the input of said second delay line and a second input of said second adder.

9. A video signal processing circuit according to claim 8, further comprising:
- a first wide-pass filter connected between the output from said first delay line and the first input of said first adder; and
- a second wide-pass filter connected between the output from said second delay line and the first input of said second adder.

10. A video signal processing circuit according to claim 8, further comprising:
- a first low-pass filter connected to an output of said first adder; and
- a second low-pass filter connected to an output of said second adder.

11. A video signal processing circuit according to claim 7, wherein said first sampled channel and second unsampled channel operate in accordance with the PAL television standard.

12. A video signal processing circuit according to claim 7, wherein said first sampled channel and second unsampled channel operate in accordance with the SECAM television standard.

13. A method for balancing a pulse response of a first sampled channel and a second unsampled channel for chrominance signals in a video signal processing circuit, the method comprising:
- performing at least one smoothing low-pass filter operation in the first sampled channel, the performing comprising
  - demodulating a chrominance signal,
  - coupling a first demodulated chrominance signal to a first delay line,
  - connecting an output of the first delay line to a first smoothing low-pass filter,
  - coupling a second demodulated chrominance signal to a second delay line, and
  - connecting an output of the second delay line to a second smoothing low-pass filter; and
- performing a first continuous compensation low-pass filter operation in the second unsampled channel for balancing the pulse response of the first sampled channel and the second unsampled channel.

14. A method according to claim 13, further comprising:
- performing a second continuous compensation low-pass filter operation on a signal between the input of the first delay line and a second input of a first adder; and
- performing a third continuous compensation low-pass filter operation on a signal between the input of the second delay line and a second input of a second adder.

15. A method according to claim 14, further comprising:
- performing a first wide-pass filter operation on a signal between the output from the first delay line and the first input of the first adder; and
- performing a second wide-pass filter operation on a signal between an output from the second delay line and the first input of the second adder.

* * * * *

UNITED STATES PATENT AND TRADEMARK OFFICE
CERTIFICATE OF CORRECTION

PATENT NO. : 6,496,227 B1                                    Page 1 of 1
DATED      : December 17, 2002
INVENTOR(S) : Régis Lemaitre It is certified that error appears in the above-identified patent and that said Letters Patent is hereby corrected as shown below:

<u>Title page,</u>
Item [22], delete "May 21, 1999" and insert -- April 19, 1999 --

Signed and Sealed this

Fifth Day of August, 2003

JAMES E. ROGAN
*Director of the United States Patent and Trademark Office*